July 24, 1928.
E. M. HÜNNEBECK
SELF CONTAINED LATTICE WORK
Filed Aug. 17, 1925
1,678,435
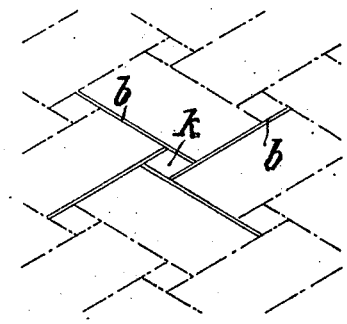
Fig. 1
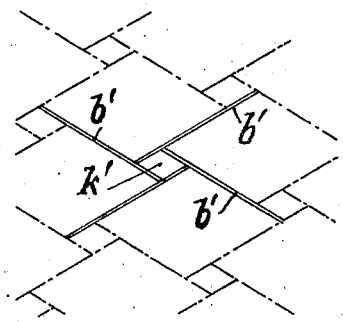
Fig. 2
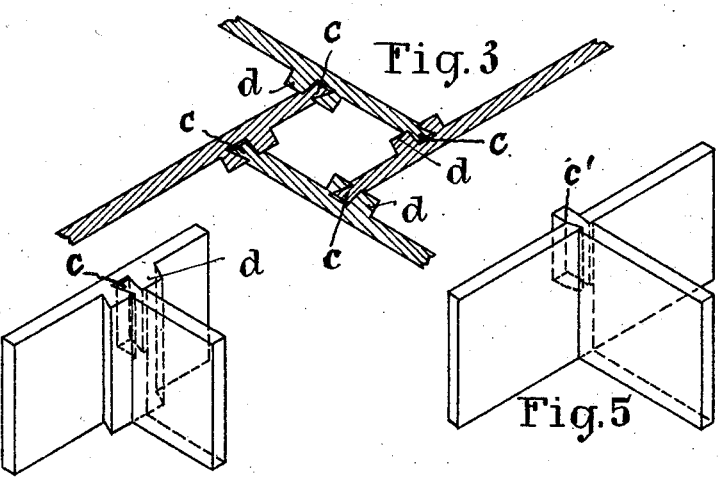
Fig. 3
Fig. 4
Fig. 5
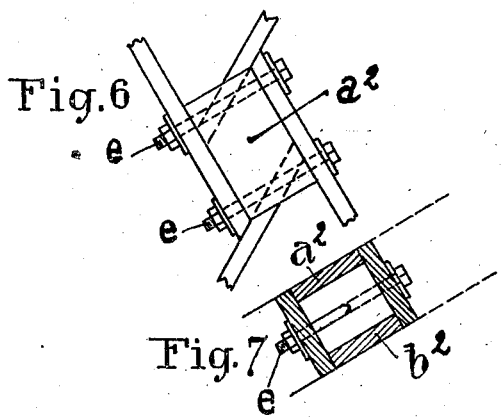
Fig. 6
Fig. 7
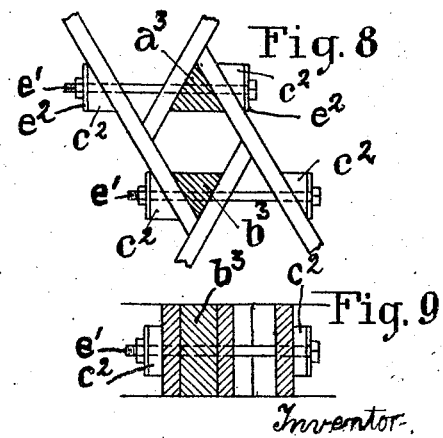
Fig. 8
Fig. 9
Inventor.
Emil Moritz Hünnebeck
by Kerrichaetes
Atty.

Patented July 24, 1928.

1,678,435

UNITED STATES PATENT OFFICE.

EMIL MORITZ HÜNNEBECK, OF HOSEL, GERMANY.

SELF-CONTAINED LATTICEWORK.

Application filed August 17, 1925, Serial No. 50,785, and in Germany August 19, 1924.

My invention relates to self-contained lattice-work in space, comprising a plurality of staggered bars. The lattice-work may consist of a rhombic-, square-, rectangular- or parallelogram-shaped system, each four bars in said system being so arranged that each bar at each end is connected with other bars at two points. Each bar extending in a given direction is abutted against a bar extending transversally thereto, and connected with said bar. Moreover, two more bars extending in the same direction as the bars to which said first mentioned bar is connected at its ends, abut against said first mentioned bar at a short distance from its ends, which may be equal to ¼ or ⅓ of its length, said bars being also connected with said first mentioned bar.

The bars of the lattice-work therefore correspond to girders on four bearings which are fixed at both end bearings and at the two intermediate bearings. In this manner, the stress exerted on the bars is favourable from a static point of view and the system is very rigid.

The connection at the knots may be effected by any suitable means, for instance by tenons engaging corresponding holes, or by bolts.

In the drawings affixed to this specification and forming part thereof lattice-works embodying my invention are illustrated diagrammatically by way of example.

In the drawings,

Figs. 1 and 2 illustrate two systems of lattice-work developed,

Fig. 3 is a longitudinal section of a knot, showing the ends of the bars connected by tenons, Figs. 4 and 5 are perspective views illustrating two different methods of connecting bars by means of tenons, Figs. 6 and 7 and Figs. 8 and 9 are plan views and transverse sections, respectively, of lattice-work the bars of which are connected by bolts.

Referring now to the drawings, Fig. 1 shows a system in which the knots $k$ are rhombic in plan view. The bars $b$ are indicated by double lines, and the system lines are shown in dot and dash lines. The bays of the system are parallelograms.

The system illustrated in Fig. 2 is similar, its knots $k'$ being rhombic as in Fig. 1, but its bars $b'$ forming rhombic bays instead of parallelograms.

The knots $k$ and $k'$ may be constructed in various ways, as mentioned above. Figs. 3, 4 and 5 illustrate connections by means of tenons, such tenons $c$ being formed at both ends of each bar as shown in Fig. 3. In the example illustrated, the tenons $c$ are dovetailed and adapted to engage corresponding recesses in brackets $d$ secured to or formed integral with the bars. The brackets $d$ as shown in Figs. 3 and 4 may be dispensed with and the dovetailed ends $c'$ of the bars may be inserted directly into slots formed in the mating bar as shown in Fig. 5. It will appear from Figs. 4 and 5 that the dovetailed tenons extend over part of the edges of the bars only. For instance, the length of the dovetailed tenon may be half the depth of a bar.

Referring now to Figs. 6 and 7, $a^2$ and $b^2$ are stays inserted between two parallel bars which bars are connected with said stays and one another by means of bolts $e$. The mating bars are held between the stays $a^2$ and $b^2$ and each bolt $e$ extends through two parallel bars and one of the mating bars which extends at an angle thereto, as will be clearly seen in Fig. 6.

In the knot shown in Figs. 8 and 9, wedge-shaped fittings $a^3$ and $b^3$ are inserted at two opposite angles of a knot. Bolts $e'$ extend through each wedge $a^3$ and $b^3$, and fittings $c^2$ of triangular section are inserted between washers $e^2$ and the knots and heads of the bolts $e'$. In this case as well as in the construction shown in Figs. 6 and 7, each bolt $e'$ traverses three bars.

I wish it to be understood that I do not desire to be limited to the exact details of construction shown and described, for obvious modifications will occur to a person skilled in the art.

I claim:

1. Self-supporting lattice in space, comprising strips having considerable width as compared with their thickness, and in the direction of their width extending in planes substantially perpendicular to the plane of the lattice as a whole, said strips being so arranged at the points of intersection that the end of each strip is connected in two points with abutting strips.

2. Self-supporting lattice in space, comprising strips having considerable width as compared with their thickness, and in the direction of their width extending in planes substantially perpendicular to the plane of the lattice as a whole, four strips being so arranged at the points of intersection that the end of each strip is connected in two points with abutting strips.

3. Self-supporting lattice in space, comprising strips having considerable width as compared with their thickness, and in the direction of their width extending in planes substantially perpendicular to the plane of the lattice as a whole, said strips being so arranged at the points of intersection that each strip is supported by abutting strips at each end in two points intermediate its ends.

In testimony whereof I affix my signature.

EMIL MORITZ HÜNNEBECK.